(12) United States Patent
Cadima

(10) Patent No.: US 9,696,039 B2
(45) Date of Patent: Jul. 4, 2017

(54) GAS BURNER ASSEMBLY

(71) Applicant: General Electric Company, Schenectady, NY (US)

(72) Inventor: Paul Bryan Cadima, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 399 days.

(21) Appl. No.: 14/598,264

(22) Filed: Jan. 16, 2015

(65) Prior Publication Data

US 2016/0209044 A1  Jul. 21, 2016

(51) Int. Cl.
*F24C 3/12* (2006.01)
*G01K 1/14* (2006.01)

(52) U.S. Cl.
CPC .............. *F24C 3/122* (2013.01); *F24C 3/126* (2013.01); *G01K 1/146* (2013.01)

(58) Field of Classification Search
CPC ......... F24C 3/122; F24C 3/126; G01K 1/146; G01K 1/08
See application file for complete search history.

(56) References Cited

U.S. PATENT DOCUMENTS 4,646,963 A * 3/1987 Delotto .................. F24C 3/126
126/39 G
4,770,545 A   9/1988 Takada et al.

FOREIGN PATENT DOCUMENTS

| JP | 1163506 A | 3/1999 |
| JP | 3691462 B2 | 9/2005 |
| JP | 2014077593 A | 5/2014 |

* cited by examiner

*Primary Examiner* — Alfred Basichas
(74) *Attorney, Agent, or Firm* — Dority & Manning, P.A.

(57) ABSTRACT

A gas burner assembly includes a burner body that defines a plurality of flame ports. A temperature probe extends from the burner body such that a distal end of the temperature probe is positioned above the burner body along the vertical direction. A jacket is positioned over the distal end of the temperature probe. A bottom flange of the jacket is positioned adjacent a bottom portion of the burner body.

20 Claims, 4 Drawing Sheets

GAS BURNER ASSEMBLY

FIELD OF THE INVENTION

The present subject matter relates generally to gas burner assemblies, such as gas burner assemblies for cooktop appliances.

BACKGROUND OF THE INVENTION

Gas cooktop appliances generally include a plurality of gas burners mounted at a top surface of the appliance. Certain gas cooktop appliances include gas burners with spring loaded temperature sensors. When cooking utensils are positioned on a grate above such gas burners, the spring loaded temperature sensor contacts the cooking utensil and measures a temperature of the cooking utensil. The gas burner deactivates if temperature measurements from the spring loaded temperature sensor exceed a maximum temperature. Thus, if a pot boils dry, the spring loaded temperature sensor prevents the gas burner from heating the pot to an undesirable temperature.

Gas burners with spring loaded temperature sensors have certain shortcomings. For example, debris can slide between the spring loaded temperature sensor and other components of the gas burner and accumulate beneath the top surface of the appliance. As another example, liquids can flow along the spring loaded temperature sensor and pool beneath the top surface of the appliance. Access to areas beneath the top surface of the appliance is generally limited, and cleaning such areas can be difficult. Further, the debris and liquids often include food particles, and food particles can attract pests and/or produce unpleasant odors as the food particles collect beneath the top surface of the appliance.

Accordingly, a gas burner with features for limiting or preventing food particle accumulation beneath the gas burner would be useful.

BRIEF DESCRIPTION OF THE INVENTION

The present subject matter provides a gas burner assembly. The gas burner assembly includes a burner body that defines a plurality of flame ports. A temperature probe extends from the burner body such that a distal end of the temperature probe is positioned above the burner body along the vertical direction. A jacket is positioned over the distal end of the temperature probe. A bottom flange of the jacket is positioned adjacent a bottom portion of the burner body. Additional aspects and advantages of the invention will be set forth in part in the following description, or may be apparent from the description, or may be learned through practice of the invention.

In a first exemplary embodiment, a gas burner assembly that defines a vertical direction is provided. The gas burner assembly includes a burner body that defines a plurality of flame ports. A temperature probe extends through the burner body such that a distal end of the temperature probe is positioned above the burner body along the vertical direction. The distal end of the temperature probe is movable along the vertical direction between an extended position and a retracted position. A biasing mechanism is coupled to the temperature probe. The biasing mechanism urges the distal end of the temperature probe towards the extended position. A jacket is positioned over the distal end of the temperature probe. A bottom flange of the jacket is positioned below a bottom surface of the burner body along the vertical direction.

In a second exemplary embodiment, a cooktop appliance that defines a vertical direction is provided. The cooktop appliance includes a panel that defines an opening. A grate is positioned over the opening of the panel. A gas burner is positioned beneath the grate. The gas burner includes a burner body positioned at a top surface of the top panel. The burner body defines a plurality of flame ports. A temperature probe extends from the burner body. The temperature probe is movable along the vertical direction such a distal end of the temperature probe is positioned above the grate along the vertical direction in an extended configuration. A biasing mechanism is coupled to the temperature probe such that the biasing mechanism urges the temperature probe towards the extended configuration. A jacket is positioned over the distal end of the temperature probe. A bottom flange of the jacket is positioned adjacent a bottom portion of the burner body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
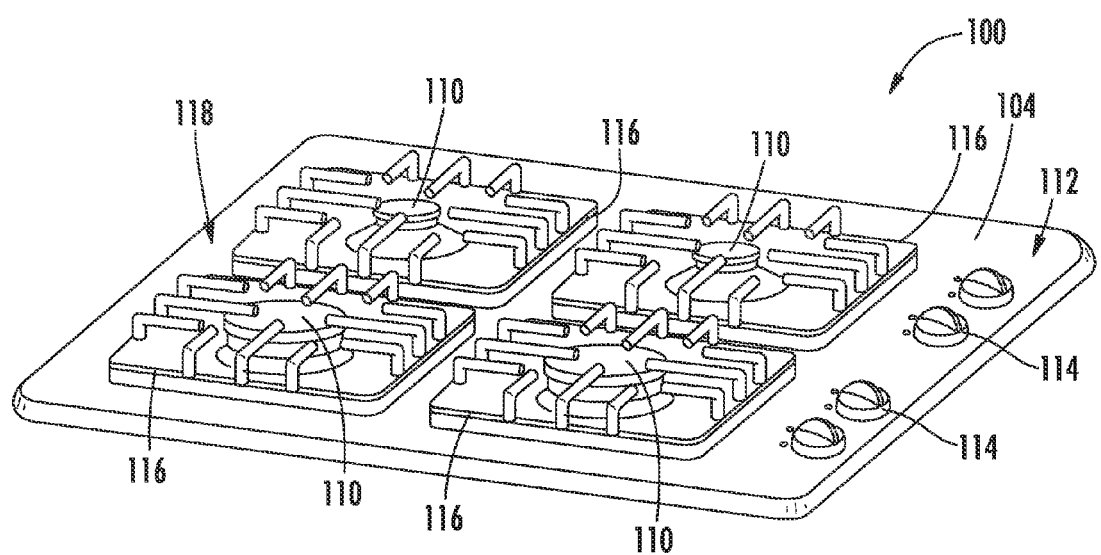
FIG. 1 provides a perspective view of a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a cooktop appliance 100 as may be employed with the present subject matter. Cooktop appliance 100 includes a material that provides a top panel 104. By way of example, the material may include stainless steel, glass, ceramics, enameled steel, and combinations thereof.

For cooktop appliance 100, a utensil holding food and/or cooking liquids (e.g., oil, water, etc.) is placed onto grates 116 at a location of any of burner assemblies 110. As shown in FIG. 1, burners assemblies 110 can be configured in various sizes so as to provide e.g., for the receipt of cooking utensils (i.e., pots, pans, etc.) of various sizes and configurations and to provide different heat inputs for such cooking utensils. Grates 116 are supported on a top 118 of top panel 104. Burner assemblies 110 provide thermal energy to cooking utensils on grates 116. In particular, burner assemblies 110 extend through top panel 104 below grates 116. Burner assemblies 110 may be mounted to top panel 104.

A user interface panel 112 is located within convenient reach of a user of the cooktop appliance 100. For this exemplary embodiment, panel 112 includes knobs 114 that are each associated with one of burner assemblies 110 or a control valve associated with each of the burner assemblies 110. Knobs 114 allow the user to activate each burner assembly and determine the amount of heat input provided by each burner assembly 110 to a cooking utensil located thereon. Panel 112 may also be provided with one or more graphical display devices that deliver certain information to the user such as e.g., whether a particular heating source is activated and/or the level at which the element is set.

Although shown with knobs 114, it should be understood that controls 114 and the configuration of cooktop appliance 100 shown in FIG. 1 is provided by way of example only. More specifically, user interface 112 may include various input components, such as one or more of a variety of touch-type controls, electrical, mechanical or electro-mechanical input devices including rotary dials, push buttons, and touch pads. The user interface 112 may include other display components, such as a digital or analog display device designed to provide operational feedback to a user.

Cooktop appliance 100 shown in FIG. 1 illustrates an exemplary embodiment of the present subject matter. Thus, although described in the context of cooktop appliance 100, the present subject matter may be used in cooktop appliances having other configurations, e.g., a cooktop appliance with one, two, or more additional burner assemblies. Similarly, the present subject matter may be used in other appliances, e.g., range appliances having cooktop burners, outdoor grills, etc.

Figure 2:
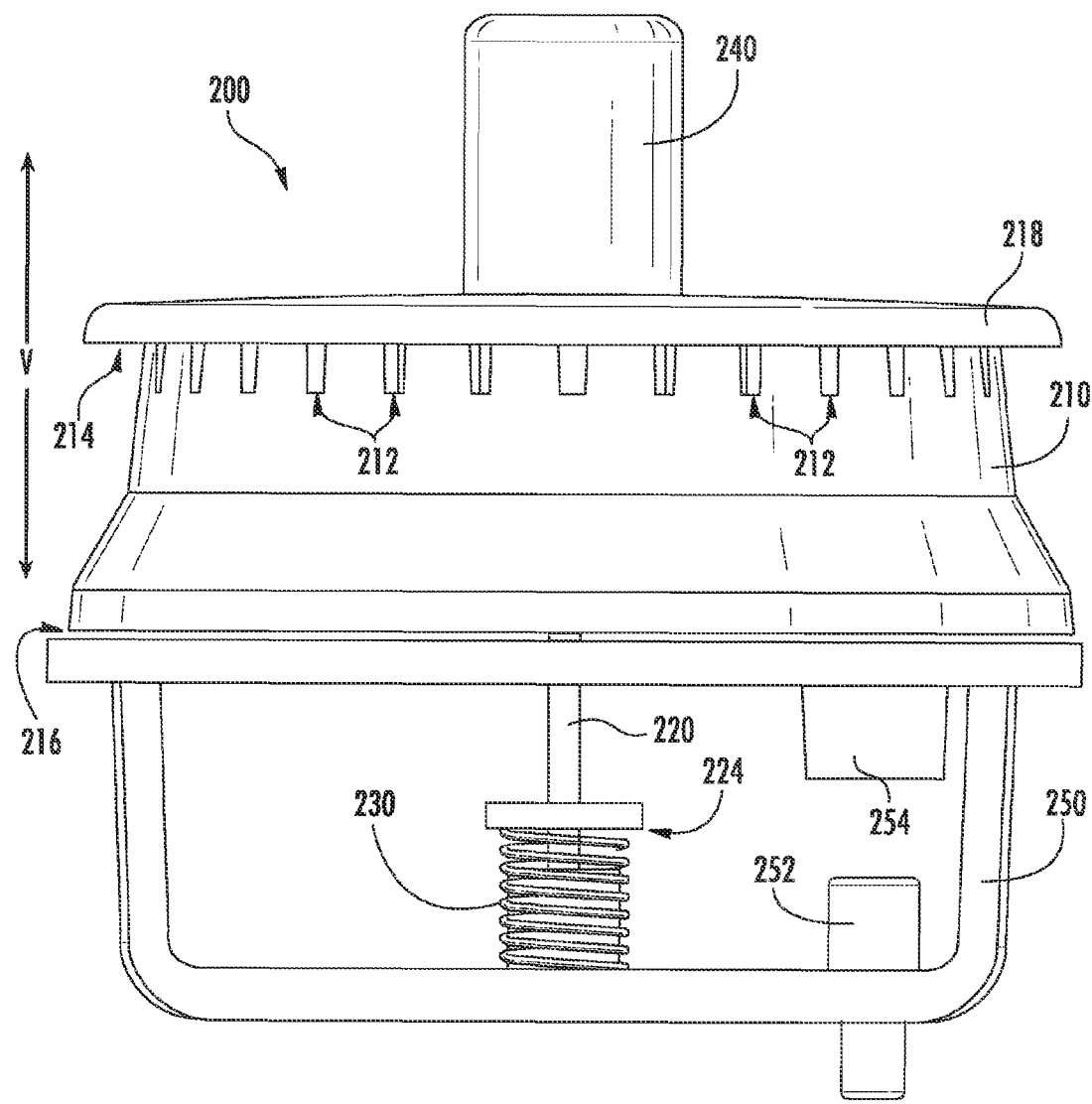
FIG. 2 provides a side, elevation view of a gas burner assembly according to an exemplary embodiment of the present subject matter.
Figure 3:
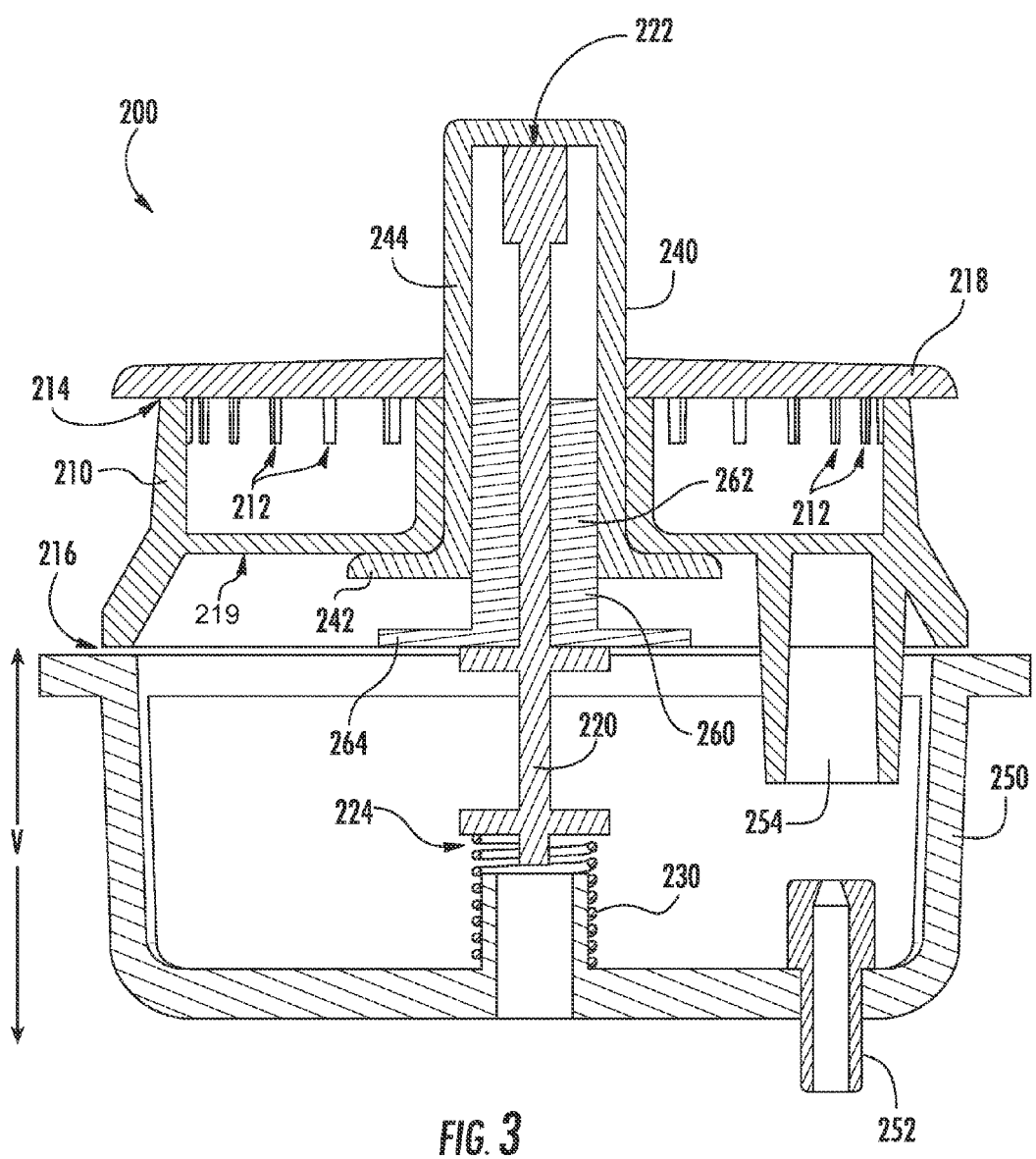
FIG. 3 provides a section view of the exemplary gas burner assembly of FIG. 2.

FIG. 2 provides a side, elevation view of a gas burner assembly 200 according to an exemplary embodiment of the present subject matter. FIG. 3 provides a section view of gas burner assembly 200. Gas burner assembly 200 may be used in any suitable appliance. For example, gas burner assembly 200 may be used in cooktop appliance 100 (FIG. 1) as one of burners assemblies 110. As discussed in greater detail below, gas burner assembly 200 includes features that assist within preventing or limiting debris accumulation, e.g., beneath top panel 104 of cooktop appliance 100. Gas burner assembly 200 defines a vertical direction V.

As may be seen in FIGS. 2 and 3, gas burner assembly 200 includes a burner body 210. Burner body 210 extends between a top portion 214 and a bottom portion 216, e.g., along the vertical direction V. Thus, top portion 214 of burner body 210 and bottom portion 216 of burner body 210 are spaced apart from each other, e.g., along the vertical direction V. Bottom portion 216 of burner body 210 may rest on and contact top panel 104 of cooktop appliance 100.

Burner body 210 defines a plurality of flame ports 212. Flame ports 212 may be positioned at or adjacent top portion 214 of burner body 210. In particular, flame ports 212 may be circumferentially distributed around top portion 214 of burner body 210. Burner body 210 may also include a cover plate 218 positioned at top portion 214 of burner body 210 over flame ports 212. Gaseous fuel within burner body 210 may exit burner body 210 at flame ports 212, and the gaseous fuel may be burned at flame ports 212 in order to heat a cooking utensil above gas burner assembly 200.

Gas burner assembly 200 also includes a temperature probe 220, a biasing mechanism 230 and a jacket 240. Temperature probe 220 extends from or through burner body 210 upwardly along the vertical direction V. In particular, a distal end 222 of temperature probe 220 may be positioned above burner body 210 along the vertical direction V. Temperature probe 220 is also movable along the vertical direction V relative to burner body 210. In particular, distal end 222 of temperature probe 220 is movable along the vertical direction V between an extended position (shown in FIGS. 2 and 3) and a retracted position relative to burner body 210. Distal end 222 of temperature probe 220 is positioned closer to burner body 210 along the vertical direction V when distal end 222 of temperature probe 220 is in the retracted position than when distal end 222 of temperature probe 220 is in the extended position.

Temperature probe 220 is configured for measuring a temperature of a cooking utensil being heated by gas burner assembly 200. For example, temperature probe 220 may contact or be in thermal communication with (e.g., via conductive material of jacket 240) the cooking utensil in order to measure the temperature of the cooking utensil. Temperature probe 220 may be any suitable type of temperature sensor. For example, temperature probe 220 may be a thermocouple, thermistor, etc.

Biasing mechanism 230 is coupled to temperature probe 220. Biasing mechanism 230 urges or biases distal end 222 of temperature probe 220 towards the extended position. In such a manner, biasing mechanism 230 may assist with maintaining contact or thermal communication between temperature probe 220 and the cooking utensil being heated by gas burner assembly 200. Biasing mechanism 230 may be any suitable mechanism for urging or biasing temperature probe 220 upwardly along the vertical direction V. For example, biasing mechanism 230 may be a coil spring, a gas spring, a linear actuator, etc.

Jacket 240 is positioned over at least a portion of temperature probe 220. For example, jacket 240 may be positioned over distal end 222 of temperature probe 220. In particular, jacket 240 includes a tubular body 244, and distal end 222 of temperature probe 220 may be positioned within tubular body 244 of jacket 240. Jacket 240, e.g., at least a portion of tubular body 244 of jacket 240, may be constructed of or with a thermally conductive material in order to allow suitable operation of temperature probe 220, e.g., in the manner described above. Jacket 240 may be removably mounted to temperature probe 220 and may travel with temperature probe 220 between the extended and retracted positions.

Jacket 240 also includes a bottom flange 242. Tubular body 244 of jacket 240 extends from bottom flange 242 of jacket 240 over distal end 222 of temperature probe 220 along the vertical direction V. Bottom flange 242 of jacket 240 may be positioned at or adjacent bottom portion 216 of burner body 210. For example, bottom flange 242 of jacket 240 may be positioned at or in contact with a bottom surface 219 of burner body 210 when temperature probe 220 is in the extended position, as shown in FIG. 3. Thus, bottom flange 242 of jacket 240 may be positioned below bottom surface 219 of burner body 210 along the vertical direction V, and tubular body 244 of jacket 240 may extend from bottom flange 242 of jacket 240 upwardly along the vertical direction V through burner body 210. Bottom flange 242 of jacket 240 may assist with limiting or preventing debris accumulation directly below jacket 240 along the vertical direction V.

Gas burner assembly 200 also includes a mounting bracket 250. Mounting bracket 250 is positioned below burner body 210 along the vertical direction V. Mounting bracket 250 is configured to be secured to an associated panel in order to mount gas burner assembly 200 to the associated panel, as discussed in greater detail below. Biasing mechanism 230 may be coupled to mounting bracket 250 such that biasing mechanism 230 extends between mounting bracket 250 and a proximal end 224 of temperature probe 220.

Mounting bracket 250 also includes features for directing gaseous fuel into burner body 210. In particular, mounting bracket 250 includes a fuel nozzle 252. Fuel nozzle 252 may be coupled to a gaseous fuel supply line. Gaseous fuel from fuel nozzle 252 is directed towards and into a Venturi mixing tube 254 of burner body 210. Thus, nozzle 252 may be positioned on mounting bracket 250 such that nozzle 252 is positioned directly Venturi mixing tube 254 of burner body 210 along the vertical direction V. From Venturi mixing tube 254, the gaseous fuel flows into burner body 210 and to flame ports 212 of burner body 210.

Gas burner assembly 200 further includes a seal 260. Seal 260 assists with hindering or preventing debris from accumulating below gas burner assembly 200. Seal 260 includes a cylindrical body 262 and a bottom flange 264. Cylindrical body 262 of seal 260 extends upwardly from bottom flange 264 of seal 260, e.g., along the vertical direction V. Cylindrical body 262 of seal 260 is at least partially positioned within tubular body 244 of jacket 240. Thus, cylindrical body 262 of seal 260 may be received within tubular body 244 of jacket 240. Bottom flange 264 of seal 260 may contact or rest on a top surface of an associated panel. Seal 260 may be constructed of or with any suitable material. For example seal 260 may be constructed of or with an elastic material, such as a polymer.

Figure 4:
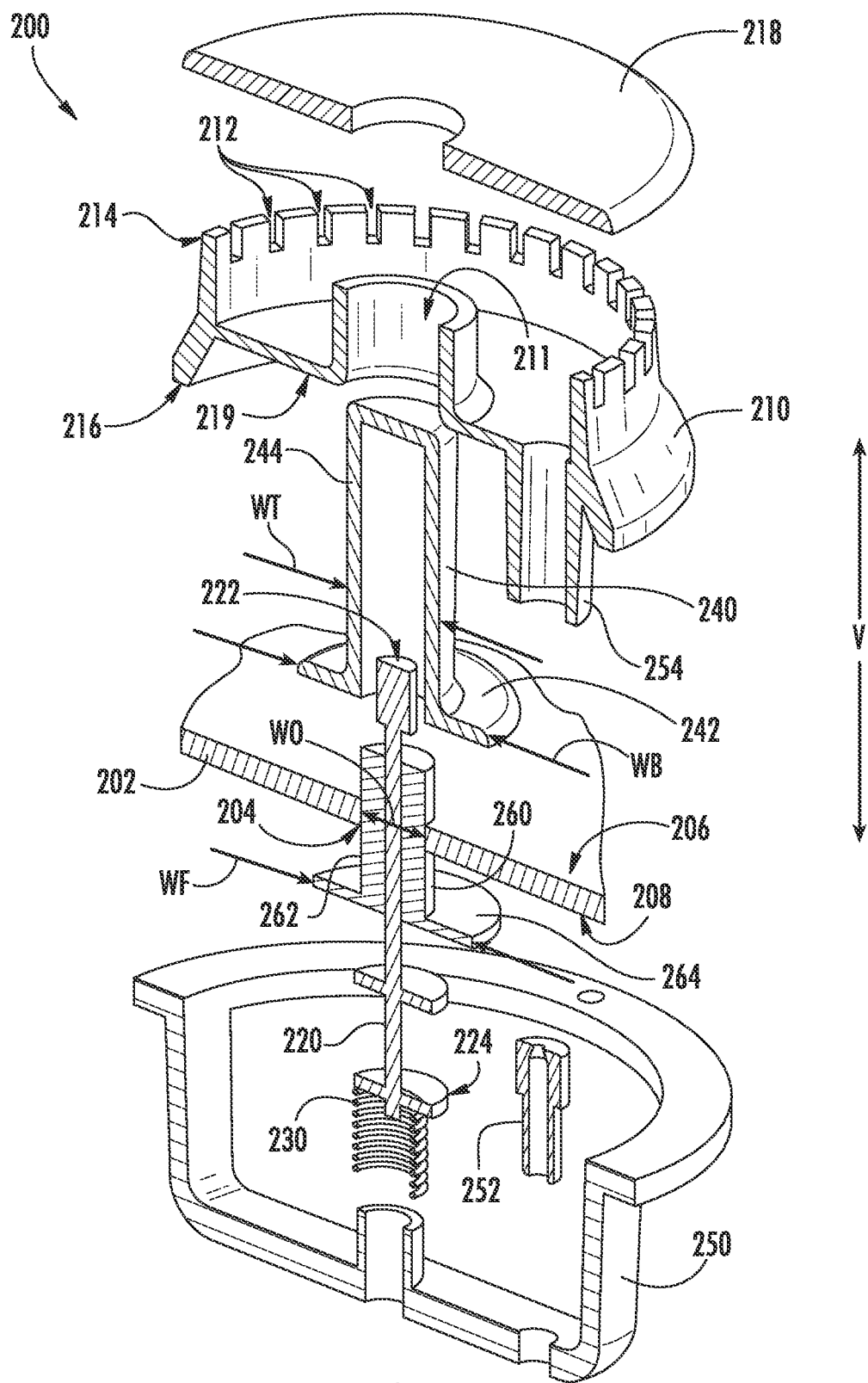
FIG. 4 provides an exploded, perspective view of the exemplary gas burner assembly of FIG. 3.

FIG. 4 provides an exploded, perspective view gas burner assembly 200 and a panel 202. Gas burner assembly 200 may be mounted to or positioned on panel 202. As an example, panel 202 may correspond to and be constructed in a similar manner to top panel 104 of cooktop appliance 100 (FIG. 1). As discussed in greater detail below, gas burner assembly 200 includes features for hindering or preventing spills from passing through panel 202 along the vertical direction V. Thus, gas burner assembly 200 may assist with hindering or preventing debris from collecting or accumulating below panel 202.

As may be seen in FIG. 4, panel 202 defines an opening 204. Panel 202 also has a top surface 206 and a bottom surface 208. Top surface 206 and bottom surface 208 of panel 202 are spaced apart from each other along the vertical direction V. Mounting bracket 250 may be secured or mounted to panel 202 at bottom surface 208 of panel 202, and burner body 210 may be positioned on or at top surface 206 of panel 202. Thus, panel 202 may be positioned between burner body 210 and mounting bracket along the vertical direction V. Opening 204 of panel 202 may extend along the vertical direction V between top surface 206 and bottom surface 208 of panel 202.

Various components of gas burner assembly 200 may pass through opening 204 of panel 202. For example, temperature probe 220 may extend through opening 204 of panel 202. Jacket 240 and seal 260 assist with hindering or preventing debris from passing through opening 204 of panel 202 and accumulating below panel 202. In particular, the sizing of jacket 240 and seal 260 relative to opening 204 of panel 202 may assist with hindering or preventing debris from passing through opening 204 of panel 202 and accumulating below panel 202, as discussed in greater detail below.

Opening 204 of panel 202 defines a width WO, e.g., in a plane that is perpendicular to the vertical direction V. The width WO of opening 204 may be any suitable width. Bottom flange 242 of jacket 240 also has a width WB, e.g., in a plane that is perpendicular to the vertical direction V. The width WB of bottom flange 242 of jacket 240 may be any suitable width. As shown in FIG. 4, the width WB of bottom flange 242 of jacket 240 may be greater than the width WO of opening 204. In certain exemplary embodiments, the width WB of the bottom flange 242 of jacket 240 may be at least five percent greater than, at least ten percent greater than or at least twenty percent greater than the width WO of opening 204.

Tubular body 244 of jacket 240 also defines a width WT, e.g., in a plane that is perpendicular to the vertical direction V. The width WT of tubular body 244 may be any suitable width. As shown in FIG. 4, the width WT of tubular body 244 may be less than the width WB of bottom flange 242 of jacket 240. In certain exemplary embodiments, the width WB of the bottom flange 242 of jacket 240 may be at least five percent greater than, at least ten percent greater than or at least twenty percent greater than the width WT of tubular body 244.

Bottom flange 264 of seal 260 also defines a width WF, e.g., in a plane that is perpendicular to the vertical direction V. The width WF of bottom flange 264 of seal 260 may be any suitable width. As shown in FIG. 4, the width WF of bottom flange 264 of seal 260 may be greater than the width WO of opening 204. In certain exemplary embodiments, the width WF of the bottom flange 264 of seal 260 may be at least five percent greater than, at least ten percent greater than or at least twenty percent greater than the width WO of opening 204.

Due to the sizing of jacket 240 and seal 260, e.g., the sizing of bottom flange 242 of jacket 240 and bottom flange 264 of seal 260 relative to opening 204 of panel 202, jacket 240 and seal 260 may hinder or block debris from passing through opening 204 of panel 202. In particular, when bottom flange 242 of jacket 240 and/or bottom flange 264 of seal 260 are larger than opening 204 of panel 202, bottom flange 242 of jacket 240 and/or bottom flange 264 of seal 260 may obstruct or prevent debris from passing through opening 204 of panel 202. As an example, fluid spilled from a cooking utensil may fall onto gas burner assembly 200. The fluid may flow into burner body 210 on an outer surface of jacket 240, and bottom flange 242 of jacket 240 may direct the flow of fluid away from opening 204 of panel 202. Similarly, bottom flange 264 of seal 260 may act as a dam and direct the flow of fluid away from opening 204 of panel 202. In such a manner, jacket 240 and/or seal 260 may assist with keeping an area under gas burner assembly 200 clean and tidy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas burner assembly defining a vertical direction, the gas burner assembly comprising:
   a burner body defining a plurality of flame ports;
   a temperature probe extending through the burner body such that a distal end of the temperature probe is positioned above the burner body along the vertical direction, the distal end of the temperature probe movable along the vertical direction between an extended position and a retracted position;
   a biasing mechanism coupled to the temperature probe, the biasing mechanism urging the distal end of the temperature probe towards the extended position; and
   a jacket positioned over the distal end of the temperature probe, a bottom flange of the jacket positioned below a bottom surface of the burner body along the vertical direction.

2. The gas burner assembly of claim 1, further comprising a mounting bracket and a panel, the panel positioned between the burner body and the mounting bracket along the vertical direction, the panel defining an opening, the temperature probe extending through the opening along the vertical direction.

3. The gas burner assembly of claim 2, wherein the opening of the panel has a width in a plane that is perpendicular to the vertical direction, the bottom flange of the jacket also having a width in a plane that is perpendicular to the vertical direction, the width of the bottom flange being greater than the width of the opening.

4. The gas burner assembly of claim 2, further comprising a seal positioned on the temperature probe above the opening of the panel, the seal having a bottom flange positioned on the panel at the opening of the panel, the bottom flange of the seal being wider than the opening of the panel in a plane that is perpendicular to the vertical direction.

5. The gas burner assembly of claim 2, wherein the bottom flange of the jacket is sized and positioned for directing liquid flowing on an outer surface of the jacket away from the opening of the panel.

6. The gas burner assembly of claim 1, further comprising a mounting bracket positioned below the burner body along the vertical direction, the biasing mechanism extending between the mounting bracket and the temperature probe.

7. The gas burner assembly of claim 6, wherein the biasing mechanism is a spring.

8. The gas burner assembly of claim 1, wherein the jacket includes a tubular body that extends from the bottom flange of the jacket over the distal end of the temperature probe, the tubular body of the jacket having a width in a plane that is perpendicular to the vertical direction, the bottom flange of the jacket also having a width in a plane that is perpendicular to the vertical direction, the width of the bottom flange being greater than the width of the tubular body.

9. The gas burner assembly of claim 1, wherein the temperature probe extends through a central portion of the burner body.

10. The gas burner assembly of claim 1, wherein the jacket is removable from the temperature probe.

11. A cooktop appliance defining a vertical direction, the cooktop appliance comprising:
    a panel defining an opening;
    a grate positioned over the opening of the panel; and
    a gas burner positioned beneath the grate, the gas burner comprising
       a burner body positioned at a top surface of the top panel, the burner body defining a plurality of flame ports;
       a temperature probe extending from the burner body, the temperature probe movable along the vertical direction such a distal end of the temperature probe is positioned above the grate along the vertical direction in an extended configuration;
       a biasing mechanism coupled to the temperature probe such that the biasing mechanism urges the temperature probe towards the extended configuration; and
       a jacket positioned over the distal end of the temperature probe, a bottom flange of the jacket positioned adjacent a bottom portion of the burner body.

12. The cooktop appliance of claim 11, wherein the gas burner further comprises a mounting bracket, the mounting bracket positioned at a bottom surface of the panel such that the panel is positioned between the burner body and the mounting bracket along the vertical direction, the temperature probe extending from the mounting bracket through the opening along the vertical direction.

13. The cooktop appliance of claim 12, wherein the opening of the panel has a width in a plane that is perpendicular to the vertical direction, the bottom flange of the jacket also having a width in a plane that is perpendicular to the vertical direction, the width of the bottom flange being greater than the width of the opening.

14. The cooktop appliance of claim 12, wherein the gas burner further comprises a seal positioned on the temperature probe above the opening of the panel, the seal having a bottom flange positioned on the panel at the opening of the panel, the bottom flange of the seal being wider than the opening of the panel in a plane that is perpendicular to the vertical direction.

15. The cooktop appliance of claim 12, wherein the bottom flange of the jacket is sized and positioned for directing liquid flowing on an outer surface of the jacket away from the opening of the panel.

16. The cooktop appliance of claim 11, wherein the gas burner further comprises a mounting bracket, the mounting bracket positioned at a bottom surface of the panel such that the panel is positioned between the burner body and the mounting bracket along the vertical direction, the biasing mechanism extending between the mounting bracket and the temperature probe.

17. The cooktop appliance of claim 16, wherein the biasing mechanism is a spring.

18. The cooktop appliance of claim 11, wherein the jacket includes a tubular body that extends from the bottom flange of the jacket over the distal end of the temperature probe, the tubular body of the jacket having a width in a plane that is perpendicular to the vertical direction, the bottom flange of the jacket also having a width in a plane that is perpendicular to the vertical direction, the width of the bottom flange being greater than the width of the tubular body.

19. The cooktop appliance of claim 11, wherein the temperature probe extends through a central portion of the burner body.

20. The cooktop appliance of claim 11, wherein the jacket is removable from the temperature probe.

* * * * *